United States Patent
Bestmann et al.

(10) Patent No.: US 7,312,893 B2
(45) Date of Patent: Dec. 25, 2007

(54) METHOD FOR THE PRINTING-PROCESS TRANSFORMATION OF THE COLOR PRINT FOR BLACK/WHITE IMAGES

(75) Inventors: Günter Bestmann, Altenholz (DE); Helmut Siegeritz, Kronshagen (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 1010 days.

(21) Appl. No.: 10/348,453

(22) Filed: Jan. 21, 2003

(65) Prior Publication Data

US 2003/0151757 A1    Aug. 14, 2003

(30) Foreign Application Priority Data

Feb. 11, 2002    (DE)    ................ 102 05 476

(51) Int. Cl.
*G06F 15/00*    (2006.01)
*H04N 1/46*    (2006.01)
*G06K 9/00*    (2006.01)

(52) U.S. Cl. .................. 358/1.9; 358/504; 382/167

(58) Field of Classification Search ............. 358/1.9, 358/504; 382/162, 167, 277; 345/590
See application file for complete search history.

(56) References Cited

U.S. PATENT DOCUMENTS 6,088,038 A    7/2000   Edge et al.
6,331,899 B1   12/2001  Samadani
2002/0131063 A1  9/2002 Krabbenhoft et al.

FOREIGN PATENT DOCUMENTS

DE    199 46 585 A1    4/2001
EP    0 898 417 A2     2/1999
EP      898417 A2 *    2/1999

* cited by examiner

*Primary Examiner*—King Y. Poon
*Assistant Examiner*—Thomas J. Lett
(74) *Attorney, Agent, or Firm*—Laurence A. Greenberg; Werner H. Stemer; Ralph E. Locher

(57) ABSTRACT

A method for transforming device dependent color values [C1, M1, Y1, K1] of a first printing process into device dependent color values [C2, M2, Y2, K2] of a second printing process, the printing processes being characterized by color profiles setting the device dependent color values of the printing processes in a relationship with the device independent color values of the LAB or XYZ color space, includes determining, from the profiles of the printing process, a one-dimensional assignment function $K2=f(K1)$, and describing the paper white of the first printing process by the color values [C2pw, M2pw, Y2pw, K2pw] of the second printing process. Pure gray colors from the first printing process having the device dependent color values [C1=0, M1=0, Y1=0, K1] are transformed into the device dependent color values [C2pw, M2pw, Y2pw, K2pw+f(K1)] of the second printing process. The assignment function is determined from the lightness curves of the first and second color profiles that, in each case, apply to printing only with black printing ink.

8 Claims, 2 Drawing Sheets

METHOD FOR THE PRINTING-PROCESS TRANSFORMATION OF THE COLOR PRINT FOR BLACK/WHITE IMAGES

BACKGROUND OF THE INVENTION

Field of the Invention

The invention relates to the field of electronic reproduction technology and pertains to a method for the transformation of color values that have been produced for a first printing process into the color values of a second printing process so that the visual impression of the colors is the same in both printing processes, the intention being for black/white image information that is printed only with the black printing ink in the first printing process also to be printed substantially only with the black printing ink in the second printing process.

In reproduction technology, printing originals for printing pages are produced that contain all the elements to be printed, such as texts, graphics, and images. In the case of the electronic production of the printing originals, these elements are present in the form of digital data. For an image, the data is generated, for example, by the image being scanned point-by-point and line-by-line in a scanner, each image point being broken down into color components and the color components being digitized. Images are usually broken down in a scanner into the color components red, green, and blue [R,G,B], that is to say, into the components of a three-dimensional color space. However, other color components are needed for color printing. In four-color printing, these are the printing inks cyan, magenta, yellow, and black [C,M,Y,K], that is to say, the components of a four-dimensional color space. For such a purpose, the image data from the RGB color space of the scanner must be transformed into the CMYK color space of the printing process to be used.

Such color space transformations are needed in reproduction technology because all the devices and processes have their restrictions and special features in the representation and reproduction of the colors, and all the devices and processes have different such characteristics. There are, therefore, different color spaces for various devices and processes, such as scanners, monitors, proof output devices, printing processes, and so on, the color spaces in each case describing the color characteristics of the device or process in an optimum way and being called device dependent color spaces.

In addition to the device dependent color spaces, there are also device independent color spaces that are based on the human visual characteristics of what is referred to as a standard observer. Such color spaces are, for example, the CIE-XYZ color space defined by the Commission Internationale d'Éclairage (CIE) standardization commission or the LAB color space derived therefrom, the LAB color space having become more widespread in the technology. If it is desired to know whether two colors will be perceived as the same or different by the human eye, then the measurement of the CIE-XYZ or LAB color components is sufficient. The LAB color components form a color space with a lightness axis [L] and two color axes [A,B], which can be imagined in the plane of a color circle through whose center the lightness axis runs. The LAB color components are related to the CIE-XYZ color components through nonlinear conversion equations.

A device or a process can be characterized with regard to its color characteristics by all the possible value combinations of the associated device dependent color space being assigned the LAB color components that a human will see in the colors produced by these value combinations. For a printing process, the various CMYK value combinations in each case produce a different printed color. Using a calorimeter, it is possible to determine the LAB components of the printed colors and to assign them to the CMYK value combinations. Such an assignment, which sets the device dependent colors produced by a device or a process in a relationship with a device independent color space (CIE-XYZ or LAB) is also called a color profile, an output color profile in the case of a printing process. The definition and data format for color profiles have been standardized by the International Color Consortium (ICC)—Specification ICC.1:1998-09. In an ICC color profile, the assignment of the color spaces in both directions is stored, for example, the assignment LAB=f1 (CMYK) and the inverted assignment CMYK=f2 (LAB).

The assignment defined by a color profile can be implemented with the aid of a table memory. If, for example, the CMYK color components of a printing process are to be assigned the LAB color components, the table memory must have a memory location for each possible value combination of the CMYK color components, in which location the associated LAB color components are stored. However, such a simple assignment method has a disadvantage that the table memory can become very large because of the large number of possible value combinations. To reduce the size of the table memory, therefore, a combination of table memory and interpolation methods is used to describe a color profile and to implement an appropriate color space transformation. The table memory is not used to store the assignments for all the possible value combinations of the CMYK color components but only for a coarser, regular grid of reference points in the CMYK color space, for example, for a grid having 16×16×16×16=65,536 grid points. For each grid point, the associated components of the LAB color space are stored as reference points in the table memory. For CMYK value combinations that lie between the grid points, the LAB values to be assigned are interpolated from the adjacent reference points. For the inverted assignment CMYK=f2 (LAB), for example, a grid of 16×16×16=4096 grid points is formed in the LAB color space, and the associated CMYK values are stored as reference points in the table memory.

The assignments given in the color profiles between device dependent color spaces and a device independent color space (for example, LAB) can be used for color space transformation between the device dependent color spaces so that, for example, the color values [C1, M1, Y1, K1] of a first printing process are converted into the color values [C2, M2, Y2, K2] of a second printing process such that, according to the visual impression, the second print has the same colors as the first print. Such a color space transformation is required if a printed page that is to be printed later by offset printing, for example, is to be output firstly on a proof printer, for example, an inkjet printer, the intention being for the colors to be reproduced in exactly the same way as they will appear in the result of the offset printing.

FIGS. 1A and 1B show a color space transformation for such a printing process adaptation according to the prior art in a block diagram. In FIG. 1A, a first color space transformation 1 from the color values [C1, M1, Y1, K1] of the first printing process into LAB color values, and a second color space transformation 2 from the LAB color values into the color values [C2, M2, Y2, K2] of the second printing process are listed one after the other. The two color space transformations 1 and 2 can also be multiplied together to form a linked color space transformation 3, which assigns the color values [C1, M1, Y1, K1] and the color values [C2, M2, Y2, K2] to one another directly (FIG. 1B). Because, through the device independent LAB intermediate color space, in each case the color values [C1, M1, Y1, K1] and [C2, M2, Y2, K2] that result in the same LAB color values are assigned to one another, the associated printing colors in the two printing processes will be perceived as visually identical within the printing color gamut.

However, one disadvantage with such a method is that what is called the black build-up of the first printing process is lost. Black build-up is understood to be the composition of printed colors with respect to their proportion of the black printing ink K. The intention, in particular, is for purely black colors, such as texts or black/white images, which are built up only with the printing ink K1 in the first printing process, that is to say, contain no [C1, M1, Y1] components, to be built up virtually exclusively with the printing ink K2 in the second printing process as well. Small proportions of [C2, M2, Y2] can be added to simulate in the second printing process the color of the paper used in the first printing process. This cannot be achieved with the method according to the prior art described because, in the intermediate color space LAB, it is no longer possible to determine whether a gray color was originally built up only with a proportion of K1 and without [C1, M1, Y1] components, or whether it was composed of large proportions of [C1, M1, Y1] and only a small K1 component. In general, based upon visual equality, that is to say, the same LAB color values, mixed colors are assigned in the second printing process, in which the gray colors also contain considerable proportions of [C2, M2, Y2]. This leads to black texts and strokes being given colored edges after the printing process adaptation in the event of register errors in the proof printer. A further problem is that printing process fluctuations of the proof print in the colored inks [C2, M2, Y2] immediately lead to clearly visible color casts in the black/white images. In addition, slight deviations from the gray axis, which can occur as a result of unavoidable residual inaccuracies in the four-dimensional transformation tables, are particularly striking in the black/white images.

In European Patent Application 0 898 417 A2, a solution is described that assigns to a color in the first printing process that is built up only from the black printing ink, that is to say, [C1=0, M1=0, Y1=0, K1], a color in the second printing process that is also built up only from the black printing ink, that is to say, [C2=0, M2=0, Y2=0, K2]. For such a purpose, in the first color space transformation 1 from the color values [C1, M1, Y1, K1] of the first printing process into LAB color values, the colors with the characteristic [C1=0, M1=0, Y1=0, K1] are assigned an extreme marginal area in the LAB color space that is not occupied by the chromatic colors of a natural image. In the second color space transformation 2 from the LAB color values into the color values [C2, M2, Y2, K2] of the second printing process, such a marginal area in the LAB color space is, in turn, assigned colors with the characteristic [C2=0, M2=0, Y2=0, K2]. Such a method carries the disadvantage that these colors in the LAB color space are not depicted in the way in which they are perceived visually. In addition, the method takes no account of the possibly different paper colors in the two printing processes, which may make it necessary for the pure gray colors of the first printing process, nevertheless, not to be built up purely from the black printing ink in the second printing process.

SUMMARY OF THE INVENTION

It is accordingly an object of the invention to provide a method for the printing-process transformation of the color print for black/white images that overcomes the hereinafore-mentioned disadvantages of the heretofore-known methods and devices of this general type and that avoids the aforementioned restrictions and disadvantages and to specify a method for the printing-process adaptation from a first printing process with the color values [C1, M1, Y1, K1] to a second printing process with the color values [C2, M2, Y2, K2] that operates based upon given color profiles for both printing processes. The method transforms the colors such that the visual impression of the colors is the same in both printing processes, black/white image information that is printed only with the black printing ink in the first printing process also being printed substantially only with the black printing ink in the second printing process.

With the foregoing and other objects in view, there is provided, in accordance with the invention, a method for transforming device dependent color values [C1, M1, Y1, K1] of a first printing process into device dependent color values [C2, M2, Y2, K2] of a second printing process to make visual impression of colors substantially the same in both the first and second printing processes, the first printing process being characterized by a first color profile and the second printing process being characterized by a second color profile, including the steps of placing the device dependent color values of the first and second printing processes in a relationship with the device independent color values of one of a LAB color space and a XYZ color space with the first and second color profiles, determining a one-dimensional assignment function $K2=f(K1)$ from the first and second color profiles, determining, from the first and second color profiles by multidimensional color space transformations, the color values [C2pw,M2pw,Y2pw,K2pw] describing a paper white of the first printing process in the device dependent color values of the second printing process, and transforming pure gray colors of the first printing process having device dependent color values [C1=0, M1=0, Y1=0, K1] into device dependent color values [C2pw,M2pw,Y2pw,K2pw+f(K1)] of the second printing process.

With the objects of the invention in view, there is also provided a method for transforming device dependent color values [C1, M1, Y1, K1] of a first printing process into device dependent color values [C2, M2, Y2, K2] of a second printing process to make visual impression of colors substantially the same in both the first and second printing processes, including the steps of characterizing the first printing process by a first color profile and characterizing the second printing process by a second color profile, the first and second color profiles placing the device dependent color values of the first and second printing processes in a relationship with the device independent color values of one of a LAB color space and a XYZ color space, determining a one-dimensional assignment function $K2=f(K1)$ from the first and second color profiles, determining, from the first and second color profiles by multidimensional color space transformations, the color values [C2pw,M2pw,Y2pw,K2pw] describing a paper white of the first printing process in the device dependent color values of the second printing process, and transforming pure gray colors of the first printing process having device dependent color values [C1=0, M1=0, Y1=0, K1] into device dependent color values [C2pw,M2pw,Y2pw,K2pw+f(K1)] of the second printing process.

In accordance with another mode of the invention, there is provided the step of determining the one-dimensional assignment function K2=f(K1) from a lightness curve Y1r=g1(K1) of the first color profile and a lightness curve Y2r=g2(K2) of the second color profile, the lightness curves respectively applying to printing only with a black printing ink.

In accordance with a further mode of the invention, there is provided the step of determining the lightness curve Y1r=g1(K1) from a multidimensional color space transformation of the first printing process with a condition [C1=0, M1=0, Y1=0].

In accordance with an added mode of the invention, there is provided the step of determining the lightness curve Y2r=g2(K2) from a multidimensional color space transformation of the second printing process with a condition [C2=0, M2=0, Y2=0].

In accordance with a concomitant mode of the invention, there is provided the step of transforming pure gray colors of the first printing process having the device dependent color values [C1=0, M1=0, Y1=0, K1] into device dependent color values [C2=0, M2=0, Y2=0, K2=f(K1)] of the second printing process.

Other features that are considered as characteristic for the invention are set forth in the appended claims.

Although the invention is illustrated and described herein as embodied in a method for the printing-process transformation of the color print for black/white images, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

In the method according to the invention, in addition to the multidimensional transformation tables for the first color space transformation 1 and for the second color space transformation 2 or for the color space transformation 3 linked from these (FIG. 1), which are used for the transformation of the chromatic colors, a one-dimensional assignment table is determined for a function K2=f(K1), which is used only for pure gray colors, that is to say, for colors whose CMY components are equal to zero. In the following text, an application will be assumed in which the result of a first printing process is to be simulated with a second printing process, that is to say, a proof print is produced with the second printing process. The first printing process having the color components [C1, M1, Y1, K1], is, therefore, called the intended printing process. For example, the intended printing process is an offset printing process in which a printed page is, subsequently, to be printed in a large edition. The second printing process having the color components [C2, M2, Y2, K2] is called the proof printing process. For example, the proof printing process is an inkjet printing process, with which only a few copies of the printed page are printed for checking purposes. However, the proof prints must reproduce the color reproduction of the intended printing process as accurately as possible. Furthermore, it will be assumed that the color profiles of the intended printing process and of the proof printing process are present in the ICC standard format.

To determine the function K2=f(K1), the one-dimensional tables grayTRCTag (gray tone reproduction curve) optionally present in the color profiles are used for the black/white printing. These tables represent the relationship between the color components K1 and K2 and the lightness components CIE-Y1 and CIE-Y2 in the device independent CIE-XYZ color system. The lightness component CIE-Y is connected to the lightness component L in the device independent LAB color system by a non-linear relationship.

$$L=116 \times y^{1/3}-16 \text{ or } Y=((L+16)/116)^3 \quad (1)$$

Figure 2:
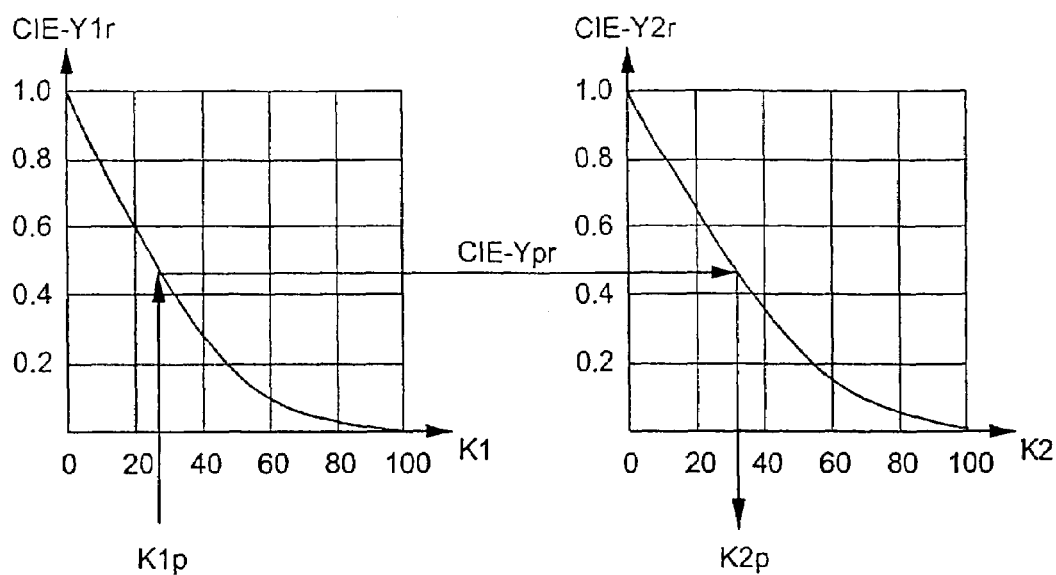
FIG. 2 are graphs of lightness curves of the color components K1 for the intended printing process and the color components K2 for the proof printing process according to the invention.

If the tables grayTRCTag describe the relationship between the color component K and the lightness component L in the LAB color system, the L component must be converted into the CIE-Y lightness component in accordance with equation (1). The one-dimensional tables grayTRCTag of the color profiles describe the lightness characteristic of the printing process for pure black/white printing, that is to say, that lightness results in each case for printing with a specific half tone percentage of the printing ink K. FIG. 2 shows as an example the relationship CIE-Y1r=g1(K1) for the intended printing process and the corresponding relationship CIE-Y2r=g2(K2) for the proof printing process. The curves appear very similar, but generally have a different curvature. In addition, it should be noted that in the grayTRCTag tables, the lightness component CIE-Y is specified as relative lightness. This means that when the value CIE-Y=1 is reached, the lightness of the respective paper white is reached, although this may be different for the printing processes. Because of the relative lightness specification, the lightness components in FIG. 2 have been called CIE-Y1r and CIE-Y2r.

The function K2=f(K1) sought is determined from the relative lightness curves CIE-Y1r=g1(K1) and CIE-Y2r=g2(K2). In the intended printing process, a specific half tone percentage K1p produces the relative lightness value CIE-Ypr. The same relative lightness value CIE-Ypr is produced in the proof printing process with a different half tone percentage K2p. A pair of values of the function K2=f(K1) is therefore determined. The remaining pairs of values are determined in the same way from the two curves.

Figure 1A:
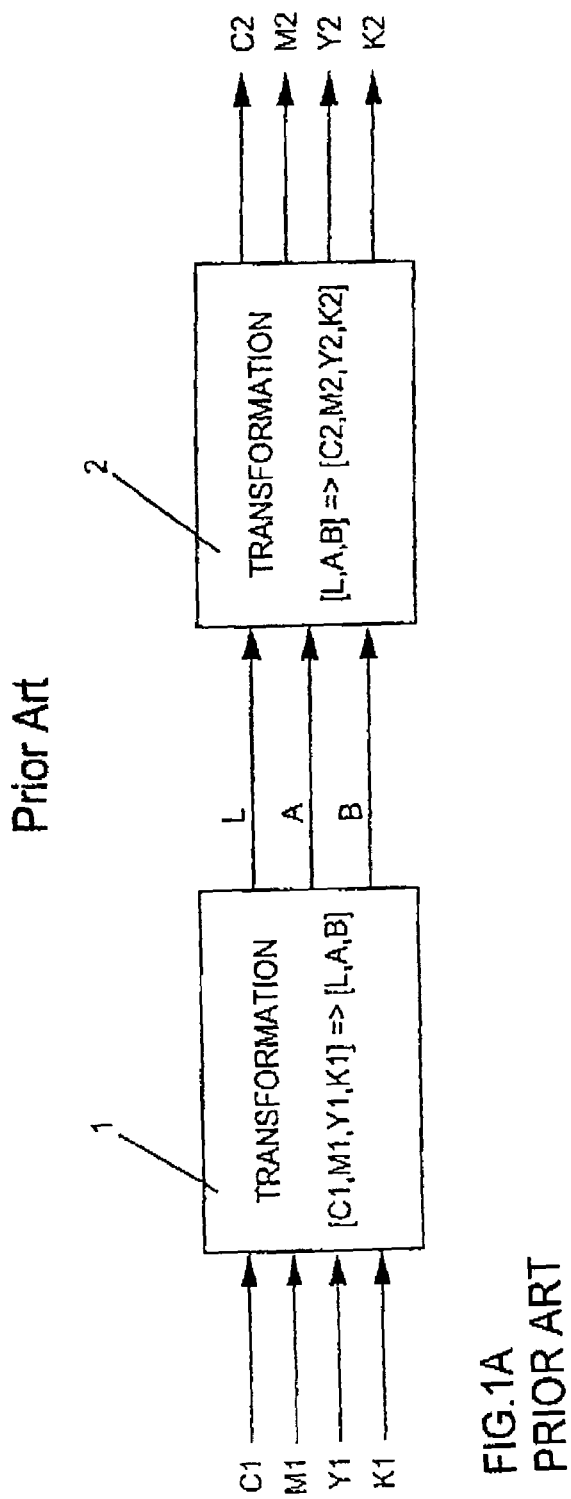
FIG. 1A is a block diagram for a prior art printing-process adaptation by color space transformations.
Figure 1B:
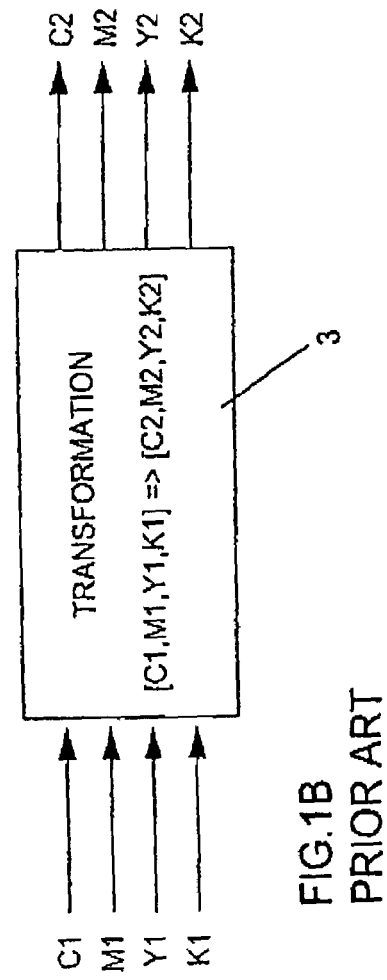
FIG. 1B is a block diagram of a prior art linked color space transformation.

Because the one-dimensional function K2=f(K1) determined only describes the relationship between the relative lightnesses of the black print in the two printing processes, the lightness and the color of the paper used in the intended printing process still has to be taken into account in adapting the printing process for the pure gray colors. The color of the paper is stored in the color profile of the intended printing process in the parameter mediaWhitePointTag, that is to say, the absolute CIE-XYZ color values that describe the paper color in the device independent CIE-XYZ color system. These values can be converted into the corresponding LAB color values. They correspond to the absolute LAB color values that result in the first color space transformation 1 for the input color components [C1=0, M1=0, Y1=0, K1=0] (FIG. 1). Under the assumption that the linked color space transformation 3 has been set up for what is called the "absolute rendering intent," that is to say, taking account of the paper colors both in the intended printing process and in the proof printing process, the transformed color components [C2pw,M2pw,Y2pw,K2pw] for the proof printing process are obtained from the linked color space transformation 3 for these input color components [C1=0, M1=0, Y1=0, K1=0]. The index pw identifies the fact that these are the color components of the proof printing process, which simulate the paper white of the intended printing process. As a rule, the value for K2pw will be equal to zero because, in the proof printing process, the black component only supplies a contribution at all to substantially darker colors.

For the purpose of complete printing-process adaptation in accordance with the method of the invention for the pure gray colors having the color components [C1=0, M1=0, Y1=0, K1], first of all, in accordance with the one-dimensional function K2=f(K1) determined, the value K2equivalent to the value of K1is determined and, then, linked additively with the transformed color components for the paper white. The transformed color components of the pure gray colors are, therefore, given by:

$$C2=C2pw$$

$$M2=M2pw$$

$$Y2=Y2pw$$

$$K2=K2pw+f(K1) \quad (2)$$

In the proof printing process, these color components correctly reproduce the pure gray colors both with respect to the lightness and with respect to the paper color of the intended printing process. Colors in the intended printing process that are not pure gray colors, that is to say, that have values different from zero for at least one of the color components [C1, M1, Y1] are transformed into the corresponding color components [C2, M2, Y2, K2] of the proof printing process with the multidimensional linked color space transformation 3.

If the paper colors are the same in both printing processes, the transformed color components of the paper white [C2pw, M2pw,Y2pw,K2pw] all result in zero. In this case or when the paper colors are virtually the same and the differences resulting from the paper colors can be neglected, for example, when the second printing process is not a proof printing process but a different offset printing process, the method according to the invention can be simplified. It is, then, sufficient to transform the pure gray colors only by the one-dimensional function K2=f(K1), that is to say, the transformed color components are given by:

$$C2=0$$

$$M2=0$$

$$Y2=0$$

$$K2=f(K1) \quad (3)$$

For the case in which, in one or in both color profiles of the printing processes, the optional table grayTRCTag is not present, according to an alternative embodiment of the invention, such a table is derived from the multidimensional transformation table LAB=f1(C,M,Y,K) that is always present. For such a purpose, in the first color space transformation 1, the input values [C1=0, M1=0, Y1=0, K1] are used, that is to say, the values CMY are set equal to zero and only the value K1 is varied from 0 to 100. The L components resulting therefrom give the lightness curve L(K1) that is converted into the CIE-Y lightness component in accordance with equation (1), that is to say, a function CIE-Y1=g1(K1) is obtained that is used instead of the table grayTRCTag for the printing-process adaptation of the pure gray colors. In the same way, a corresponding function CIE-Y2=g2(K2) is obtained from the second color space transformation 2.

We claim:

1. A method for transforming device dependent color values [C1, M1, Y1, K1] of a first printing process into device dependent color values [C2, M2, Y2, K2] of a second printing process to make visual impression of colors substantially the same in both the first and second printing processes, the first printing process being characterized by a first color profile and the second printing process being characterized by a second color profile, which comprises:
   placing the device dependent color values of the first and second printing processes in a relationship with the device independent color values of one of a LAB color space and a XYZ color space with the first and second color profiles;
   determining a one-dimensional assignment function K2=f(K1) from the first and second color profiles;
   determining, from the first and second color profiles by multidimensional color space transformations, the color values [C2pw, M2pw, Y2pw, K2pw] describing a paper white of the first printing process in the device dependent color values of the second printing process; and
   transforming pure gray colors of the first printing process having device dependent color values [C1=0, M1=0, Y1=0, K1] into device dependent color values [C2pw, M2pw, Y2pw, K2pw+f(K1)] of the second printing process.

2. The method according to claim 1, which further comprises determining the one-dimensional assignment function K2=f(K1) from a lightness curve Y1r=g1(K1) of the first color profile and a lightness curve Y2r=g2(K2) of the second color profile, the lightness curves respectively applying to printing only with a black printing ink.

3. The method according to claim 2, which further comprises determining the lightness curve Y1r=g1(K1) from a multidimensional color space transformation of the first printing process with a condition [C1=0, M1=0, Y1=0].

4. The method according to claim 3, which further comprises transforming pure gray colors of the first printing process having the device dependent color values [C1=0, M1=0, Y1=0, K1] into device dependent color values [C2=0, M2=0, Y2=0, K2=f(K1)] of the second printing process.

5. The method according to claim 1, which further comprises transforming pure gray colors of the first printing process having the device dependent color values [C1=0, M1=0, Y1=0, K1] into device dependent color values [C2=0, M2=0, Y2=0, K2=f(K1)J of the second printing process.

6. The method according to claim 2, which further comprises determining the lightness curve Y2r=g2(K2) from a multidimensional color space transformation of the second printing process with a condition (C2=0, M2=0, Y2=0].

7. The method according to claim 2, which further comprises transforming pure gray colors of the first printing process having the device dependent color values [C1=0, M1=0, Y1=0, K1] into device dependent color values

[C2=0, M2=0, Y2=0, K2=f(K1)] of the second printing process.

8. The method according to claim 6, which further comprises transforming pure gray colors of the first printing process having the device dependent color values [C1=0, M1=0, Y1=0, K1] into device dependent color values [C2=0, M2=0, Y2=0, K2=f(K1)] of the second printing process.

\* \* \* \* \*